US011877117B2

(12) United States Patent
Volmer et al.

(10) Patent No.: US 11,877,117 B2
(45) **Date of Patent: *Jan. 16, 2024**

(54) GAS MASK AND HELMET WITH A COMMUNICATION SYSTEM

(71) Applicant: Drägerwerk AG & Co. KGaA, Lübeck (DE)

(72) Inventors: Achim Volmer, Krummesse (DE); Alexander Korff, Lübeck (DE)

(73) Assignee: Drägerwerk AG & Co. KGaA, Lübeck (DE)

( * ) Notice: Subject to any disclaimer, the term of this patent is extended or adjusted under 35 U.S.C. 154(b) by 0 days.

This patent is subject to a terminal disclaimer.

(21) Appl. No.: 17/830,581

(22) Filed: Jun. 2, 2022

(65) Prior Publication Data

US 2022/0329930 A1 Oct. 13, 2022

Related U.S. Application Data

(62) Division of application No. 16/764,591, filed as application No. PCT/EP2018/081066 on Nov. 13, 2018, now Pat. No. 11,463,800.

(30) Foreign Application Priority Data

Nov. 16, 2017 (DE) ..................... 10 2017 010 604.5

(51) Int. Cl.
*H04R 1/10* (2006.01)
*A42B 3/30* (2006.01)

(52) U.S. Cl.
CPC ............. *H04R 1/1083* (2013.01); *A42B 3/30* (2013.01); *H04R 2201/107* (2013.01)

(58) Field of Classification Search
CPC ... H04R 3/02; H04R 3/04; H04R 3/06; H04R 3/08; H04R 3/14; H04R 3/007; H04R 5/04; H04R 25/453; H04R 25/50; H04R 25/505; H04R 25/507; H04R 25/554; H04R 1/1083; H04R 1/1091; H04R 1/10; H04R 1/08; H04R 1/1041; H04R 1/1016; H04R 29/001; H04R 3/00; H04R 3/002;
(Continued)

(56) References Cited

U.S. PATENT DOCUMENTS

2006/0286933 A1* 12/2006 Harkins ................ H04W 84/10 455/41.2
2010/0246836 A1* 9/2010 Johnson, Jr. ............. H04R 5/04 381/58

(Continued)

*Primary Examiner* — Leshui Zhang
(74) *Attorney, Agent, or Firm* — McGlew and Tuttle, P.C.

(57) ABSTRACT

A communication system includes a headset, which is configured to output sound waves to an ear of a user based on an audio signal, as well as a microphone, which is configured to output a microphone signal based on ambient sound. The communication system further contains a processing circuit, which is configured to generate, based on the microphone signal, a signal component of the audio signal, which signal component includes information about the generation of sound waves which interfere destructively with a component of the ambient sound occurring at the ear of the user. In addition, the communication system contains a wireless interface and a control circuit, which is configured to activate the processing circuit as a function of an operating state of the wireless interface.

7 Claims, 4 Drawing Sheets

(58) Field of Classification Search
CPC ............ H04R 2420/07; H04R 2499/11; H04R 2217/03; H04R 2225/41; H04R 2225/43; H04R 2201/107; H03G 5/00; H03G 5/005; H03G 5/16; H03G 5/165; H03G 5/24; H03G 5/28; H03G 9/005; H03G 9/24; H03G 9/025; H03G 2201/702; H03G 7/007; G06F 3/165; G06F 17/3074; G10K 11/175; G10K 11/178; G10K 11/16; A42B 3/30; H04M 1/6066; G10L 21/0208
USPC ..... 381/28, 59, 55, 56, 57, 66, 67, 312–321, 381/74, 72, 26, 71.1–71.13, 83, 86, 332, 381/91, 92, 93, 95, 96, 97, 98, 99, 100, 381/101, 102, 103, 106, 107, 108, 120, 381/121; 700/94; 704/E21.007, E21.02; 455/570; 379/406.01–406.16; 327/551, 327/552, 553, 555, 560
See application file for complete search history.

(56) References Cited

U.S. PATENT DOCUMENTS

| | | | | | |
|---|---|---|---|---|---|
| 2010/0274564 | A1* | 10/2010 | Bakalos ........... | G10K 11/17853 704/500 |
| 2012/0140917 | A1* | 6/2012 | Nicholson ........ | G10K 11/17881 379/392.01 |
| 2013/0252675 | A1* | 9/2013 | Nicholson ........ | G10K 11/17817 381/71.6 |
| 2015/0281853 | A1* | 10/2015 | Eisner .................. | H04R 25/505 381/312 |

* cited by examiner

| FIG. 1-1 |
| --- |
| FIG. 1-2 |

GAS MASK AND HELMET WITH A COMMUNICATION SYSTEM

CROSS REFERENCE TO RELATED APPLICATIONS

This application is divisional of, and claims the benefit of priority under 35 U.S.C. § 120 of, U.S. application Ser. No. 16/764,591 filed May 15, 2020, which claims the benefit of priority of United States National Phase Application of International Application PCT/EP2018/081066, filed Nov. 13, 2018, and which claims the benefit of priority under 35 U.S.C. § 119 of German Application 10 2017 010 604.5, filed Nov. 16, 2017, the entire contents of which are incorporated herein by reference.

TECHNICAL FIELD

Exemplary embodiments pertain to communication systems for use in environments with high noise levels. Exemplary embodiments further pertain to gas masks or to helmets having a communication system.

TECHNICAL BACKGROUND

Firefighters or other respirator users must wear full-face masks as well as other protective clothing for their protection in many different situations. In spite of high noise levels (e.g., in case of a fire mission or mine rescue), a precise and fast communication within the mission team (i.e., internally) and with mission control (i.e., externally) is necessary in these situations. At the same time, however, ambient noises (e.g., fire-related noises, voices of people to be rescued, etc.) also have to be able to be perceived in order to make possible an adequate assessment of the situation. Likewise, hearing protection gear is important since missions often take place in environments with high noise levels that are harmful to hearing.

The communication of respirator users is therefore subject to a number of specific requirements. A good voice intelligibility of incoming radio messages, among other things, should be possible even in case of ambient loudness. Furthermore, protection against hearing damage due to ambient noises in case of simultaneous possible playback of radio messages should be guaranteed. Also, a good intelligibility of communicators, who communicate with the respirator user directly and not by radio (e.g., people to be rescued), should be guaranteed.

SUMMARY

There is thus a need to provide an improved concept for communication.

A first exemplary embodiment pertains to a gas mask or helmet with a communication system. The communication system comprises a headset that is configured to output sound waves to an ear (ears) of a user based on an audio signal. A headset is a sound transducer, which is worn in or at the ear of the user. Based on the (electrical or electromagnetic) audio signal, a component (e.g., diaphragm) of the headset is induced to vibrate in order to output the sound waves to the ear (ears) of the user. The audio signal can be received by the headset both in a wired manner (in the form of an electrical signal) and in a wireless manner (in the form of an electromagnetic signal). The communication system also comprises a microphone, which is configured to output a microphone signal based on ambient sound (i.e., sound pertaining to noises in the surrounding area of the user). Also, the microphone signal can be outputted by the microphone both in a wired manner (in the form of an electrical signal) and in a wireless manner (in the form of an electromagnetic signal.

The communication system further comprises a processing circuit, which is configured to generate, based on the microphone signal, a cancelling signal component of the audio signal, which cancelling signal component comprises information about the generation of sound waves, which interfere destructively with a component of the ambient sound occurring at the ear of the user. The sound pressure level at the ear of the user can be reduced as a result. In other words, the processing circuit provides an active noise cancelling. For example, the cancelling signal component may be a diametrically opposed or a phase-shifted reproduction of the component of the ambient sound occurring at the ear of the user in order to interfere destructively with this component. The processing circuit may comprise analog and/or digital components for generating the signal component of the audio signal. The processing circuit may have, e.g., one or more processors and one or more processor cores, an application-specific integrated circuit (ASIC), an integrated circuit (IC), a system on a chip (SoC), a programmable logic element or a field programmable gate array (FPGA) with a microprocessor, on which software runs for generating the signal component of the audio signal. Further, the processing circuit may have one or more memories, in which, e.g., the software for the generation of the signal component of the audio signal or other data can be stored.

In addition, the communication system comprises a wireless interface. The wireless interface is a component of the communication system that enables the communication system to communicate with other systems, devices, etc. in a wireless manner (i.e., modulated electromagnetic waves). For example, the wireless interface may be a radio or a (wired or wireless) interface for the connection to a radio.

The communication system further comprises a control circuit, which is configured to activate the processing circuit as a function of an operating state of the wireless interface. Like the processing circuit, the control circuit may have, e.g., one or more processors and one or more processor cores, an application-specific integrated circuit, an integrated circuit, a system on a chip, a programmable logic element or a field programmable gate array with a microprocessor, on which software runs for the (deactivation) activation of the processing circuit. In some exemplary embodiments, the control circuit and the processing circuit may also be embodied on a joint hardware component.

The control circuit makes it possible to activate the active noise cancelling of the processing circuit in an adaptive manner. Correspondingly, the reduction of the ambient sound at the ear of the user during a radio message received via the wireless interface can be made possible to improve the voice intelligibility of the incoming radio message. Correspondingly, the necessary signal level or loudness level, with which the radio message is outputted via the headset, can be reduced. For example, the control circuit may be configured to generate a signal component of the audio signal with a lower signal level, which signal component pertains to the radio message. Damage to the hearing of the user can be avoided as a result.

According to some exemplary embodiments, the control is configured, e.g., to detect the receipt of a radio message via the wireless interface and as a result to activate the processing circuit. The detection of the receipt of the radio message may take place, for example, by means of voice activity detection. Correspondingly, it can be ensured that the ambient sound at the ear of the user is reduced during the output of the radio message via the headset.

In some exemplary embodiments, the control circuit is further configured to detect an end of the receipt of the radio message and as a result to deactivate the processing circuit. Detection of the end of the receipt of the radio message may in turn take place, for example, by means of voice activity detection. By deactivating the active noise cancelling, it can be ensured that the user can, furthermore, perceive ambient noises after the end of the radio message and thus a situational awareness of the user is maintained. In this case, the deactivation of the active noise cancelling of the processing circuit may take place both immediately after detection of the end of the receipt of the radio message or even in a delayed manner (e.g., by a few tenths of a second or seconds, i.e., with hysteresis).

In some exemplary embodiments, the control circuit is further configured to detect a sending out of a radio message via the wireless interface and as a result to activate the processing circuit. The detection of the sending out of the radio message may in turn take place, for example, by means of voice activity detection or by means of a position of a push-to-talk button. The activation of the active noise cancelling of the processing circuit makes possible a reduction of the ambient sound at the ear of the user during the sending out of the radio message. Correspondingly, a distraction of the user due to the ambient sound can be reduced, so that the user can concentrate better on writing or carrying out the radio message.

According to some exemplary embodiments the control circuit is further configured to detect an end of the sending out of the radio message and as a result to deactivate the processing circuit. The detection of the end of the sending out of the radio message may in turn take place, for example, by means of voice activity detection or by means of the position of the push-to-talk button. By deactivating the active noise cancelling, it can be ensured that the user can, furthermore, perceive ambient noises after the end of the outgoing radio message and thus a situational awareness of the user is maintained. The deactivation of the active noise cancelling may in turn take place both immediately after detection of the end of the sending out of the radio message or even take place in a delayed manner.

In some exemplary embodiments, the control circuit is further configured to determine the loudness level of the ambient sound based on the microphone signal and to activate the processing circuit when the loudness level is above a reference level. Correspondingly, loudness levels harmful to the user can be detected by the control circuit and can be reduced at the ear of the user by activation of the active noise cancelling of the processing circuit. Correspondingly, the hearing of the user can be protected against high loudness levels.

According to some exemplary embodiments, the control circuit is further configured to detect signal components of the microphone signal that pertain to human speech and to generate a speech signal component of the audio signal based on the signal components of the microphone signal that pertain to human speech. The detection of signal components of the microphone signal that pertain to human speech may in turn take place, for example, by means of voice activity detection. The signal components of the microphone signal that pertain to human speech may be subject to, e.g., (digital or analog) filtering and be amplified (e.g., via an automatic gain control) for generating the signal components of the audio signal. The detection of the signal components of the microphone signal that pertain to human speech as well as the output of same via the headset are able to guarantee the intelligibility of communicators who communicate with the user directly and not by radio (e.g., people to be rescued). Correspondingly, a situational awareness of the user can be improved.

According to other exemplary embodiments, the headset comprises, e.g., sound-absorbing material, which surrounds the ear of the user to at least some extent. Correspondingly, in addition to the active noise cancelling by the processing circuit, a passive noise cancelling may also take place. As a result, the ambient sound at the ear of the user can be further reduced, so that the loudness level of the sound waves outputted by the headset can also be reduced. The protection of the hearing of the user can thus be further improved.

In some exemplary embodiments, the microphone is integrated into the headset on a side facing away from the user. The microphone may thus have a directional characteristic and make it possible to detect the ambient sound similar to the perception of the ear of the user. A muffling or distortion of the ambient sound recorded by the microphone by, e.g., the sound-absorbing material of the headset can thus be avoided.

Exemplary embodiments further pertain to a gas mask or a helmet with another communication system. The communication system comprises, in turn, a headset, which is configured to output sound waves to an ear of a user based on an audio signal as well as a microphone, which is configured to output a microphone signal based on ambient sound. The communication system further comprises a processing circuit, which is configured to generate, based on the microphone signal, a signal component of the audio signal, which signal component comprises information about the generation of sound waves, which interfere destructively with a component of the ambient sound occurring at the ear of the user. The headset, the microphone as well as the processing circuit may in this case be embodied and configured as described above. The communication system further comprises a control circuit, which is configured to determine a loudness level of the ambient sound based on the microphone signal and to activate the processing circuit when the loudness level is above a reference level. The control circuit may also be configured as described above. The control circuit makes possible the detection of loudness levels that are harmful to the user as well as the reduction of the ambient sound actually occurring at the ear of the user by activating the active noise cancelling of the processing circuit. Correspondingly, the hearing of the user can be protected against high loudness levels.

Exemplary embodiments also pertain to a gas mask or a helmet with another communication system. The communication system comprises, in turn, a headset, which is configured to output sound waves to an ear of a user based on an audio signal, as well as a microphone, which is configured to output a microphone signal based on ambient sound. In this case, the headset as well as the microphone may be embodied and configured as described above. The communication system further comprises a control circuit, which is configured to detect signal components of the microphone signal that pertain to human speech, and to generate a signal component of the audio signal based on the signal components of the microphone signal that pertain to human speech. The control circuit may also be configured as described above. The detection of the signal components of the microphone signal that pertain to human speech as well as the output of same via the headset can guarantee the intelligibility of communicators who communicate with users directly and not by radio (e.g., people to be rescued). Correspondingly, the situational awareness of the user can be improved.

All the exemplary embodiments pertain to a system surrounding the head of a user to at least some extent, namely a gas mask or helmet, with a communication system described herein. By using the communication system described here, a good voice intelligibility of incoming radio messages, the protection against hearing damage due to ambient noises as well as a good intelligibility of the communicators who communicate with the user directly and not by radio can be guaranteed when using the system surrounding the head of the user to at least some extent.

Exemplary embodiments also pertain to a gas mask with a communication system described here. A gas mask is a breathing port (i.e., the part of the respirator, which connects the airways of the respirator user to the other parts of the respirator and protects them against the ambient atmosphere) and is used to protect the user against respiratory poisons. The gas mask is, e.g., a full-face mask according to some exemplary embodiments. As an alternative, the gas mask may also be a partial mask (e.g., half mask or quarter mask). By using the communication system described here, a good voice intelligibility of incoming radio messages, protection against hearing damage due to ambient noises as well as good intelligibility of the communicators who communicate with the user directly and not by radio can be guaranteed when wearing the gas mask.

The control circuit is further configured to determine the reference level based on a loudness level measured by a second microphone on a side of the mask body facing the user in some exemplary embodiments of the gas mask. Correspondingly, the reference level can be adapted to the concrete noise level situation within the gas mask. The second microphone may, for example, be integrated into the mask in order to pick up the voice of the user for outgoing radio messages. When they are arranged within the gas mask, these microphones usually have a high sensitivity and are therefore also suitable for the detection of the ambient sound. Due to the additional use of the already present microphone for the proposed concept, the provision of additional microphones may, in addition, be avoided.

Exemplary embodiments further pertain to a helmet with a communication system described here. A helmet is a stable, protective headgear against mechanical effects. The helmet may be a combat helmet as well as a helmet for civil purposes (e.g., safety helmet such as a firefighter's helmet). Due to the use of the communication system described here, a good voice intelligibility of incoming radio messages, the protection against hearing damage due to ambient noises as well as a good intelligibility of the communicators who communicate with the user directly and not by radio can be guaranteed when wearing the gas mask.

According to some exemplary embodiments, the microphone is arranged on a side, i.e., on an outer side, of the helmet facing away from the user. In some exemplary embodiments, the microphone is, as an alternative, arranged on a side, i.e., on an inner side, of the helmet facing the user. Corresponding to the selection of the positioning of the microphone at the helmet, it is possible to achieve a directional characteristic of the microphone according to an ambient sound that is of interest or is considered to be critical. Correspondingly, a specific active reduction of the ambient sound at the ear of the user can be achieved.

Some examples of devices and/or processes are explained only as examples in more detail below with reference to the attached figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 1-2 is a bottom part of a schematic view showing an exemplary embodiment of a communication system;

FIG. 2 is a schematic view showing an exemplary embodiment of a headset;

DESCRIPTION OF PREFERRED EMBODIMENTS

Figure 1:
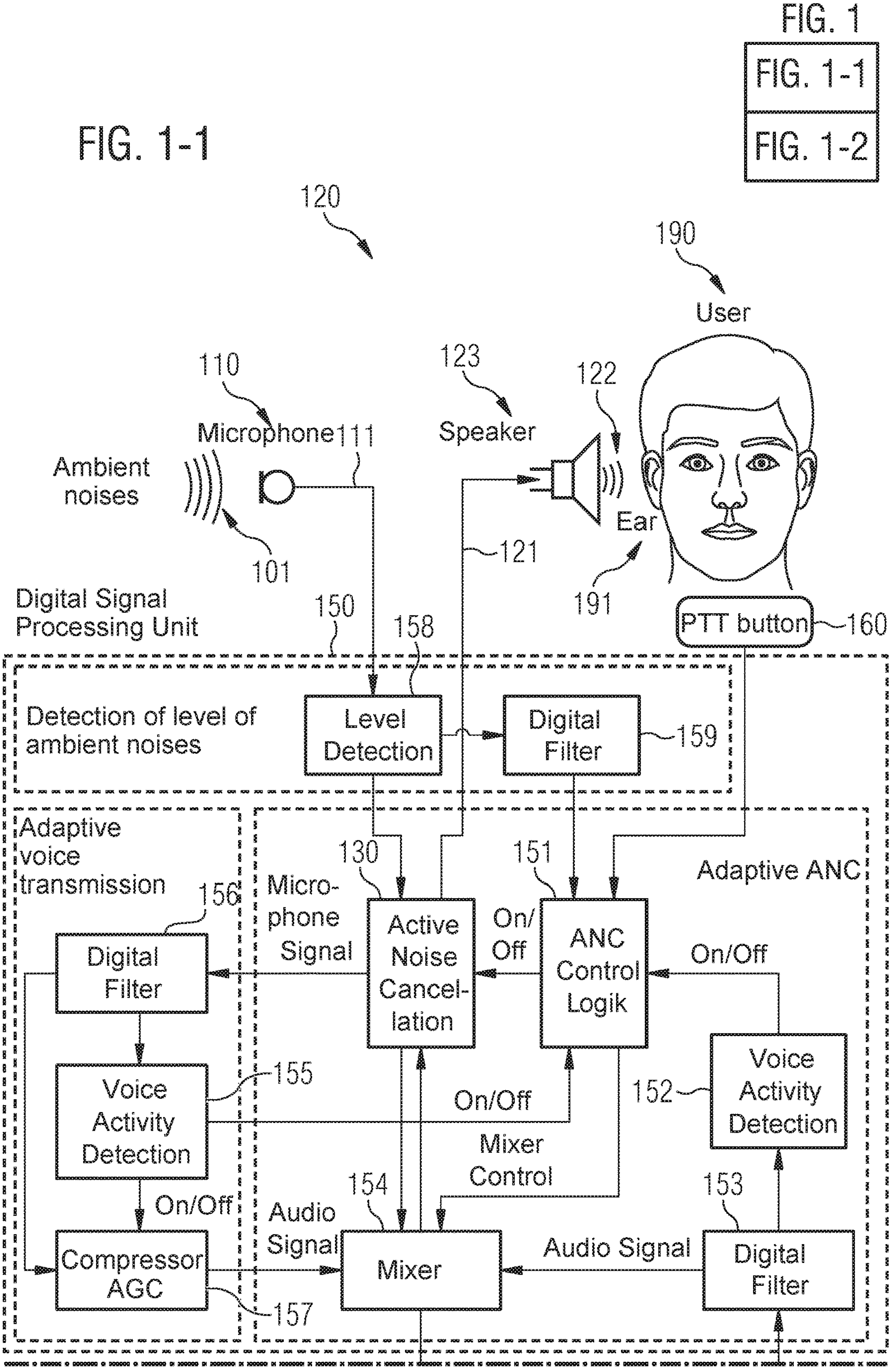
FIG. 1-1 is a top part of a schematic view showing an exemplary embodiment of a communication system.

Referring to the drawings, various examples will now be described in detail with reference to the attached figures, in which a few examples are shown. The thicknesses of lines, layers and/or areas may be exaggerated in the figures for illustration.

While other examples are suitable for different modifications and alternative forms, some particular examples of same are shown accordingly in the figures and will be described in detail below. This detailed description of other examples is, however, not limited to the particular forms described. Other examples may cover all modifications, equivalents and alternatives that are within the scope of the present disclosure.

It is clear that if an element is described as being "connected" or "coupled" with another element, the elements may be connected or coupled directly or via one or more elements located in between. If two elements A and B are combined using "or," it is clear that all possible combinations are being disclosed, i.e., only A, only B as well as A and B. Alternative wording for the same combinations is "at least one of A and B." The same applies to combinations of more than two elements.

The terminology that is being used here to describe certain examples shall not limit other examples. When a singular form, e.g., "a," "an" and "the" is being used and the use of only a single element is neither explicitly nor implicitly defined as mandatory, other examples may also use plural elements in order to implement the same function. When a function is described below as implemented using a plurality of elements, other examples may implement the same function using a single element or a single processing entity. Furthermore, it is clear that the terms "comprises," "comprising," "has" and/or "having," as used here, specify the presence of said features, integers, steps, operations, processes, elements, components and/or a group thereof, but they do not rule out the presence or the addition of one or more other features, integers, steps, operations, processes, elements, components and/or a group thereof.

Unless defined otherwise, all terms (including technical and scientific terms) are used here in their usual meaning in the field to which the examples belong.

FIG. 1 shows a communication system 100. The communication system comprises a microphone 110, which outputs a microphone signal 111 based on ambient sound 101. The communication system further comprises a headset 120, which outputs sounds waves 122 to an ear 191 of a user 190 based on an audio signal 121. As suggested in FIG. 1, the headset may have a speaker 123 for this purpose.

Figures 1, 2:
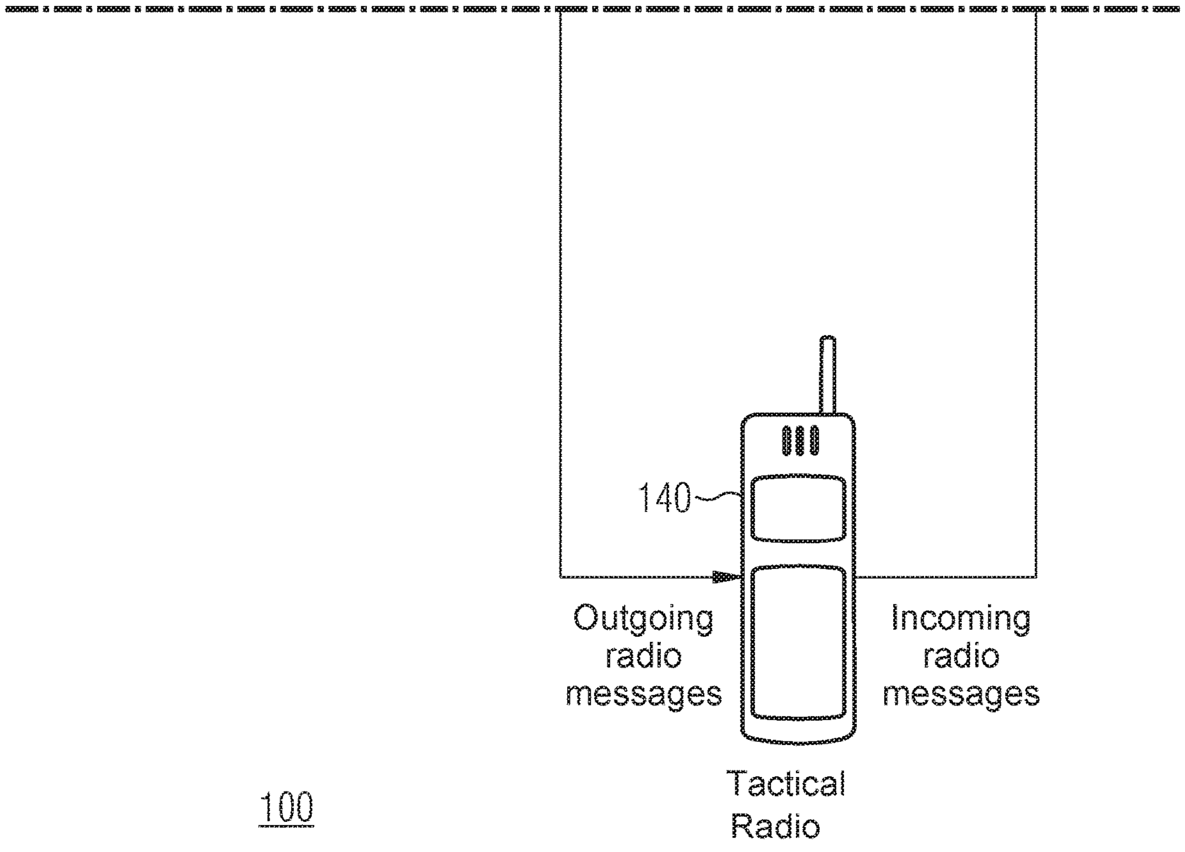
Figure 2:
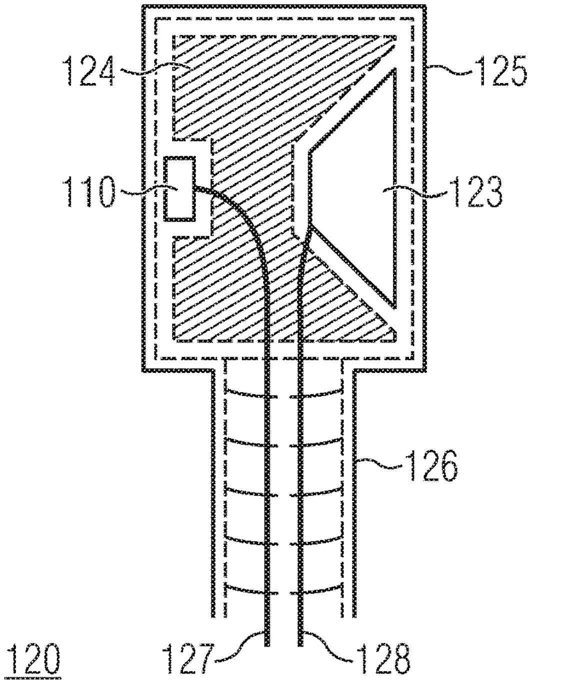

An exemplary configuration of the headset 120 as an earpiece headset is shown in FIG. 2. The headset 120 has a headset earpiece 125, which surrounds the ear of the user to at least some extent. The speaker 123 that outputs sound waves to the ear of the user based on the audio signal received via an electrical line 128 is arranged in the headset earpiece 125. The headset earpiece 125 further has a sound-absorbing material 124, which surrounds the ear of the user to at least some extent. In addition, in the example shown in FIG. 2, the microphone 100 of the proposed communication system is integrated into the headset 120 on a side facing away from the user. The microphone signal is outputted via an electrical line 127.

The communication system 100 shown in FIG. 1 further comprises a processing circuit 130 which generates a signal component of the audio signal 121 based on the microphone signal 111. The signal component of the audio signal 121 comprises information for generating sound waves 122 that interfere destructively with a component of the ambient sound 101, which component occurs at the ear 191 of the user 190. In other words, the processing circuit 130 provides an active noise cancelling.

The communication system 100 further comprises a wireless interface. In the example of FIG. 1, the wireless interface is implemented as a radio 140. As an alternative, the wireless interface may also be configured as a (wired or wireless) interface for connection to a radio.

In addition, the communication system 100 comprises a control circuit 150, which activates or deactivates the processing circuit 130 as a function of an operating state of the wireless interface. This is symbolized in FIG. 1 by the block 151, which may represent, e.g., a corresponding software component that is executed by the control circuit 150.

The control circuit 150 detects the receipt of a radio message via the wireless interface by means of voice activity detection (symbolized by block 152) and as a result activates the processing circuit 130. The control circuit further detects an end of the receipt of the radio message by means of voice activity detection and as a result deactivates the processing circuit 130. As is suggested in FIG. 1, the control circuit may also process the radio message received by means of filters (symbolized by block 153).

The control circuit 150 has a mixer function (symbolized by block 154) in order to generate the audio signal 121. In case of an incoming radio message, the control circuit generates a signal component of the audio signal 121, which signal component pertains to the radio message, via the mixer function.

The control circuit 150 makes it possible to activate the active noise cancelling of the processing circuit 130 in an adaptive manner. Correspondingly, a reduction of the ambient sound 101 at the ear 191 of the user 190 can be made possible during a radio message received via the wireless interface and thus the voice intelligibility of the incoming radio message can be improved. The necessary loudness level, with which the radio message is outputted via the headset 120, can thus also be reduced. The mixing function can be adjusted corresponding to the activity of the active noise cancelling. Damage to the hearing of the 190 can be avoided as a result. By deactivating the active noise cancelling, it can be ensured that the user 190 can, moreover, perceive ambient noises after the end of the radio message and thus a situational awareness of the user 190 is maintained.

The communication system 100 may be configured, for example, as a mask- or helmet-integrated communication system, so that it automatically detects incoming radio messages and adaptively activates the noise suppression. After completion of the radio message, active noise suppression is again automatically deactivated. The control circuit 150, which detects the incoming radio messages and adaptively activates the active noise suppression (active noise cancelling), and the processing circuit 130 may be configured as a single (digital) signal processing unit as shown in FIG. 1.

Furthermore, the control circuit 150 can detect a sending out of a radio message via the wireless interface by means of voice activity detection or by pressing the push-to-talk button 160 and as a result activate the processing circuit 130. Likewise, the control circuit 150 can correspondingly detect an end of the sending out of the radio message and again deactivate the processing circuit 130 as a result. In other words, the (digital) signal processing unit may be configured such that it (additionally) detects an outgoing radio message and adaptively activates the active noise suppression. This mechanism can enable the user 190 (e.g., a firefighter) to better concentrate on the outgoing radio message.

Furthermore, the microphone 110 (or even additional microphones) located, e.g., on the outside of the headset (earphone) 120 can be used to pick up ambient noises, i.e., the ambient sound 101, while no radio message is being received or sent. The digital signal processing unit is configured here such that human voices can be detected. In other words, the control circuit 150 further detects signal components of the microphone signal 111 pertaining to human speech (symbolized by block 155). If a voice signal is detected, it is processed, if necessary, and outputted via the headset 120 at one or both of the ears of the user 190. In other words, the control circuit 150 generates a signal component of the audio signal 121 based on the signal components of the microphone signal 111 pertaining to human speech. The processing of the signal components of the microphone signal 111 pertaining to human speech may comprise, for example, a filtering (symbolized by block 156) and/or also an automatic amplification to a desired signal level or loudness level (symbolized by block 157).

Another block of the (digital) signal processing unit is (additionally) configured to detect harmful loudness levels and advantageously to adaptively adjust the active noise suppression to protect the hearing of the user (situational awareness vs. hearing protection). For this purpose, the microphone 110 and, as an alternative, also other external microphones or even mask-integrated microphones is/are used for the voice communication of the user 190. In particular, the control circuit 150 determines a loudness level of the ambient sound 101 based on the microphone signal 111 (symbolized by block 158) and activates the processing circuit 130 when the loudness level is above a reference level (in turn symbolized by block 151). In some exemplary embodiments, the result of the comparison between the loudness level and the reference level can still be filtered (symbolized by bock 159). For this purpose, the microphone 110 can be arranged, for example, on an outer side of the headset 120 to pick up the ambient sound 101.

The reference level may be determined, for example, via one or more mask-integrated microphones for picking up the voice of the user for outgoing radio messages. These microphones are already present in the mask and have a high sensitivity. Correspondingly, no additionally mounted microphones have to be used.

The communication system 100 can adaptively free the sound signal that is in contact with the ear 191 of the user 190 from disturbing sound noises (ambient sound) such that increased intelligibility of the voice communication can be guaranteed during an incoming radio message. As already described above, the muffling of the ambient noises for a limitation of the signal level or loudness level of the radio message necessary at the ear 191 can ensure an indicator that is not harmful to hearing. At the same time, the (external) noise level can be reduced with simultaneous maintenance of the situational awareness due to the adaptive adaptation of the active noise suppression.

In addition, an amplification of external communicators can be made possible by the dual use of one or more microphones 110 at the headset (for active noise suppression and for voice amplification) by means of the (digital) signal processing unit.

Overall the communication system 100 can thus provide a considerable improvement of the voice quality of incoming radio messages and at the same time improve the intelligibility of external communicators. In addition, the communication system 100 can be enhanced by an adaptive hearing protection.

Even though the aspects of the activation of the noise cancelling as a function of the operating state of the wireless interface, of the activation of the noise cancelling as a function of the loudness level of the ambient sound and the detection and output of signal components of the microphone signal pertaining to human speech are described jointly in connection with FIG. 1, the individual aspects may also be implemented alone or each in combination with only one of the other aspects in a communication system according to the proposed concept.

Figure 3:
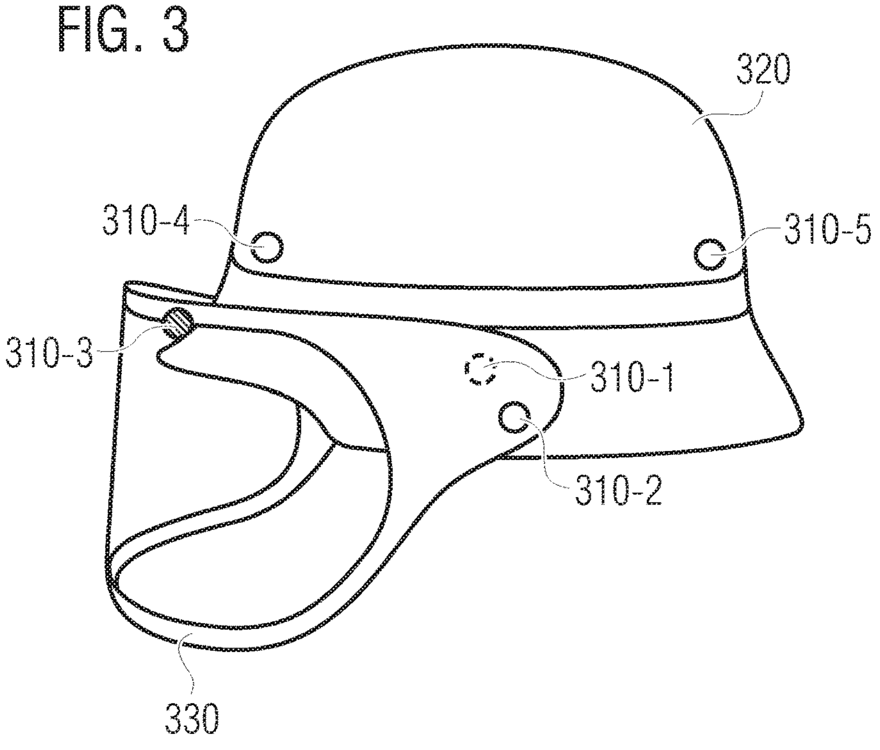
FIG. 3 is a schematic view showing an exemplary embodiment of a helmet.

FIG. 3 shows, furthermore, a helmet 300 with a communication system described here. For the sake of clarity, only the microphone 310 of the communication system is shown in this case. The microphone 310 here is shown at different points of the helmet 300. It should be noted here that the communication system may, on the one hand, comprise a single microphone at one of the points described below or may comprise a plurality of microphones at the different points described below.

For example, the microphone may be arranged at the level of the ears within the helmet shell 320 (position 310-1) or outside of the helmet shell 320 (position 310-2). Microphones positioned in the vicinity of the ear may be advantageous to detect ambient sound at the ear and then to compensate same (e.g., via the integrated earphone of the helmet 300—not shown).

As an alternative or in addition, the microphone may be mounted outside of or inside of the helmet shell 320 directed forwards on the helmet (positions 310-3 and 310-4). As suggested in FIG. 3, the microphone may be mounted on the visor 330 of the helmet 300. The microphone may also be mounted directed backwards on the helmet (position 310-5) outside of or inside of the helmet shell 320.

By using the communication system described here, a good voice intelligibility of incoming radio messages, protection against hearing damage due to ambient noises as well as a good intelligibility of the communicators who communicate with the user directly and not by radio can be guaranteed when wearing the helmet.

The arrangement of microphones shown in FIG. 3 is not limited to helmets. Rather, the principles shown in FIG. 3 may also be extrapolated to other systems covering the head or systems enclosing the head to at least some extent (e.g., respirator system, blower filter device PAPR or hazmat suit).

Figure 4:
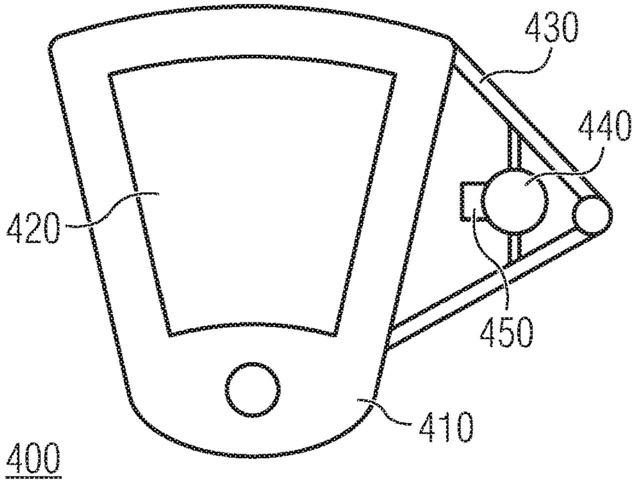
FIG. 4 is a schematic view showing an exemplary embodiment of a gas mask.

Furthermore, FIG. 4 shows a gas mask 400 with a communication system being described here. For the sake of clarity, only the microphone 410 and the headset 450 of the communication system are shown here.

The gas mask 400 comprises a mask body 410 (e.g., made of rubber or silicone), into which one or more eye-protecting lenses 420 are inserted. The gas mask 400 can be fastened to the head of a user via a strapping 430.

The headset 440 of the communication system is arranged at the level of the ears of the user. Also, the microphone 450 is arranged on an outer side of the headset in order to detect ambient sound at the ear and subsequently to compensate same. The headset 440 is fastened to the strapping 430 in the example according to FIG. 4. However, it is clear that other types of fastening are possible as well. The position of the microphone 450 may likewise be different.

By using the communication system described here, a good voice intelligibility of incoming radio messages, protection against hearing damage due to ambient noises as well as a good intelligibility of the communicators who communicate with the user directly and not by radio can be guaranteed when wearing the gas mask.

Figure 5:
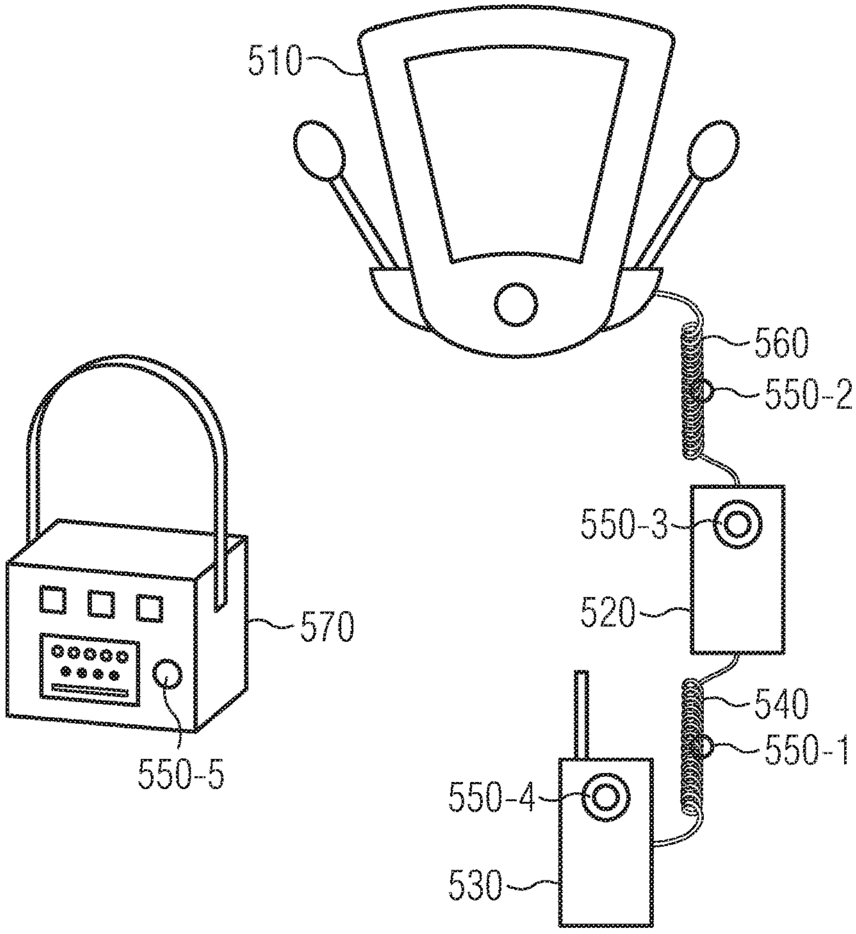
FIG. 5 is a schematic view showing examples of arrangement possibilities for a microphone.

Finally, FIG. 5 shows other arrangement possibilities for the microphone of the communication system being proposed. The positioning possibilities shown in FIG. 5 may be used especially for microphones, which are utilized for voice amplification within the scope of the proposed concept.

A gas mask 510, which is coupled with a radio 530 in a wired manner via an operating element 520, so that radio messages can be sent to third parties by a user via a microphone integrated into the gas mask 510, is shown in the example of FIG. 5.

As shown in FIG. 5, the microphone of the communication system may be arranged, for example, at the cable 560 between the radio 530 and the operating element 520 for the radio (position 550-1) or at the cable 560 between the operating element 520 and the gas mask 510 (position 550-2). As an alternative, the microphone of the communication system may also be integrated into the operating element 520 for the radio or be arranged at same (position 550-3). The microphone of the radio 530 may also be used as a microphone of the communication system (position 550-4).

Furthermore, the microphone of the communication system may also be integrated into the carrying system of the gas mask 510 (e.g., the strapping thereof) or into this gas mask itself (not shown). The microphone of the communication system may also be integrated into the clothing of the user (e.g., a jacket or a coat).

The microphone of the communication system may also be integrated, for example, into a gas-measuring device 570, which is carried, e.g., outside of the gas protective suit by a user.

All positions shown in FIG. 5 for the microphone of the communication system may make possible an improved detection of human voices in ambient sound around a user.

The aspects and features which are described together with one or more of the examples and figures described in detail above may also be combined with one or more of the other examples in order to replace an identical feature of the other example or to additionally introduce the feature into the other example.

Only the principles of the present disclosure are shown by the description and drawings. All of the examples mentioned here shall, furthermore, be expressly used, in principle, for teaching purposes only in order to support the reader in understanding the principles of the present disclosure and of the concepts contributed by the inventor(s) for the further development of the technology. All the statements made here about principles, aspects and examples of the present disclosure as well as concrete examples of same comprise equivalents thereof.

It is clear that the disclosure of a plurality of steps, processes, operations or functions disclosed in the description or the claims shall not be interpreted as occurring in the particular sequence, unless this is explicitly or implicitly indicated otherwise, e.g., for technical reasons. Therefore, these are not limited to a particular sequence due to the disclosure of a plurality of steps or functions unless these steps or functions are not interchangeable for technical reasons. Further, a single step, function, process or operation may include a plurality of partial steps, partial functions, partial processes or partial operations and/or be applied in same. Such partial steps may be included and be part of this disclosure of this single step unless they are explicitly ruled out.

Furthermore, the following claims are herewith incorporated into the detailed description, where each claim may stand alone as a separate example. While each claim may stand alone as a separate example, it should be noted that, even though a dependent claim may refer to a certain combination with one or more other claims in the claims, other examples may also comprise a combination of the dependent claim with the subject of any other dependent or independent claim. Such combinations are explicitly proposed here unless it is indicated that a certain combination is not intended. Further, features of one claim shall also be included for any other independent claim, even if this claim is not made directly dependent on the independent claim.

While specific embodiments of the invention have been shown and described in detail to illustrate the application of the principles of the invention, it will be understood that the invention may be embodied otherwise without departing from such principles.

What is claimed is:

1. A gas mask or helmet with a communication system, comprising:
- a headset configured to output sound waves to an ear of a user based on an audio signal;
- a first microphone configured to output a microphone signal based on ambient sound;
- a processing circuit having an activation and deactivation state, the activation state being configured to generate, based on the microphone signal, a signal component of the audio signal, the signal component having information about the generation of sound waves which interfere destructively with a component of the ambient sound occurring at the ear of the user, the deactivation state not generating the signal component; and
- a control circuit configured to
  - determine a loudness level of the ambient sound based on the microphone signal and to switch the processing circuit from the deactivation state to the activation state when the loudness level is above a reference level,
    - to detect speech input signal components of the microphone signal, which pertain to human speech of communicators who communicate with the user,
    - to generate a speech output signal component of the audio signal based on the speech input signal components of the microphone signal,
    - to filter the speech input signal components,
    - to amplify the filtered speech input signal components via an automatic gain control, to generate the speech output signal component, and
  - determine the reference level based on a loudness level measured by a second microphone on a side of the mask body facing the user.

2. The gas mask or helmet in accordance with claim 1, wherein the gas mask is a full-face mask.

3. The gas mask or helmet in accordance with claim 1, wherein the first microphone is arranged on a side of the helmet facing away from the user.

4. The gas mask or helmet in accordance with claim 1, wherein the headset comprises a sound-absorbing material, which surrounds the ear of the user to at least some extent.

5. The gas mask or helmet in accordance with claim 1, wherein the first microphone is integrated into the headset on a side facing away from the user.

6. A gas mask or helmet with a communication system, comprising:
- a headset configured to output sound waves to an ear of a user based on an audio signal;
- a first microphone configured to output a microphone signal based on ambient sound;
- a processing circuit having an activation and a deactivation state, the activation state being configured to generate, based on the microphone signal, a signal component of the audio signal, the signal component having information about the generation of sound waves which interfere destructively with a component of the ambient sound occurring at the ear of the user, the deactivation state not generating the signal component; and
- a control circuit configured to detect speech input signal components of the microphone signal which pertain to human speech of communicators who communicate with the user, and the control circuit is configured to generate a speech output signal component of the audio signal predominately based on the speech input signal components of the microphone signal, the control circuit filtering the speech input signal components, and amplifying the filtered speech input signal components via an automatic gain control, to generate the speech output signal, the control circuit configured to determine a loudness level of the ambient sound based on the microphone signal and to switch the processing circuit from the deactivation state to the activation state when the loudness level is above a reference level, the control circuit determines the reference level based on a loudness level measured by a second microphone on a side of the mask body facing the user.

7. A gas mask or helmet with a communication system, comprising:
- a headset configured to output sound waves to an ear of a user based on an audio signal;
- a first microphone configured to output a microphone signal based on ambient sound;
- a processing circuit having an activation and a deactivation state, the activation state being configured to generate, based on the microphone signal, a cancelling signal component of the audio signal, the cancelling signal component having information about the generation of sound waves which interfere destructively with a component of the ambient sound occurring at the ear of the user, the deactivation state not generating the cancelling signal component; and a control circuit configured to determine a loudness level of the ambient sound based on the microphone signal and to switch the processing circuit from the deactivation state to the activation state when the loudness level is above a reference level, the control circuit determines the reference level based on a loudness level measured by a second microphone on a side of the mask body facing the user, the control circuit is configured to detect signal components of the microphone signal that pertain to human speech of communicators who communicate with the user, and to generate a speech signal component of the audio signal based on the signal components of the microphone signal that pertain to human speech.

* * * * *